May 14, 1968     C. E. BARKER     3,382,789
AUTOMATIC FILM DEVELOPER
Filed April 20, 1966
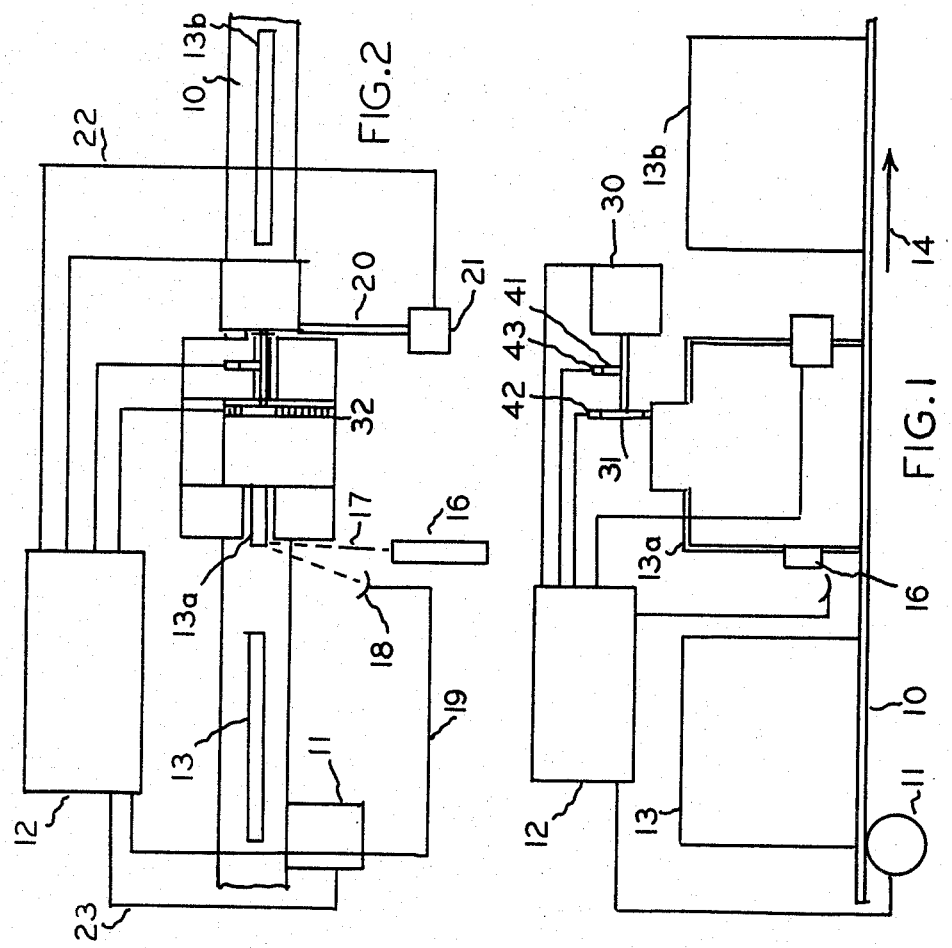
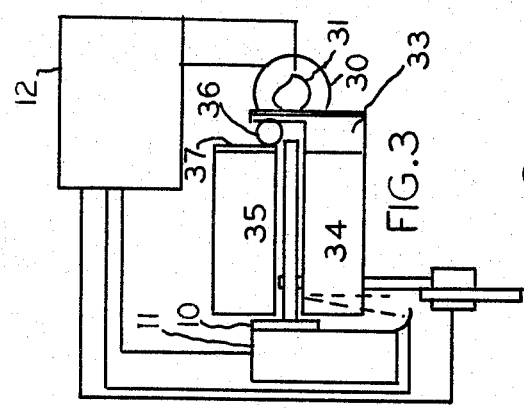
INVENTOR
CHARLES E. BARKER
by
*Richard J. Miller*
ATTY United States Patent Office 3,382,789
Patented May 14, 1968

3,382,789
AUTOMATIC FILM DEVELOPER
Charles E. Barker, Westminster, Calif., assignor, by mesne assignments, to the United States of America, as represented by the Secretary of the Navy
Filed Apr. 20, 1966, Ser. No. 545,227
6 Claims. (Cl. 95—89)

This invention relates to an automatic film processor and more specifically to a device capable of rapidly and accurately processing heat sensitive photographic film after exposure.

The art of film processing and development is one that has developed over the years; yet with current methods and modern techniques of observation, improvements are continuously necessary. The invention covered by this application is particularly adapted to fulfill these needs.

It is therefore an object of this invention to provide an improved automatic film developer.

It is yet a further object of this invention to provide an automatic film developer for automatically and sequentially processing individual, exposed photographic films under controlled conditions.

It is still a further object of this invention to provide an automatic film developer for automatically and sequentially processing individually exposed photographic films which are heat sensitive under specifically controlled conditions.

It is yet a further object of this invention to provide an improved automatic film developer for developing heat sensitive film, comprising: a movable film holder capable of holding a plurality of heat sensitive films to be developed, a first drive means for moving the film holder, a plurality of films held by the movable holder, first and second heating elements positioned adjacent the movable means capable of being moved towards and away from each other, second drive means for moving the heating elements towards and away from each other, first switching means for determining the position of individual ones of the films, and circuit means coupled to actuate the first drive means, first switch means, the second switch means, a second drive means for heating and developing consecutive one of said film.

It is a further object of this invention to provide an improved automatic film developer for developing heat sensitive film, comprising: a movable film holder capable of holding a plurality of heat sensitive films to be developed, a first drive means for moving the film holder, a plurality of films held on the movable holder, first and second heating elements positioned adjacent to the movable means capable of being moved towards and away from each other, second drive means for moving the heating elements towards and away from each other, first switching means for stopping the first drive means, second switching means for determining the position of individual ones of the films, and circuit means coupled to the first and second drive means and the first and second switching means to actuate the first drive means to advance the film, actuate the switch means to sense the position of one of the films, actuate the drive means to position of one of the films, actuate the drive means to position one of the films between the heating elements, stopping the first drive means, actuate the second drive means to juxtaposition the first and second heating elements adjacent the film, applying heating current to the heating elements for a predetermined length of time, moving the heating elements away from the film, and actuating the first drive means to advance the developed film from between the heating elements and to advance the next one of the films to be developed.

FIGURE 1 is a side view of one embodiment of the invention;

FIGURE 2 is a top view of the one embodiment of the invention; and

FIGURE 3 is a side view showing the invention.

The invention as disclosed in the figures is somewhat schematic and unnecessary items are not shown. In all three figures like numbers refer to like elements.

A moving belt 10 is driven by a motor 11 coupled to a control circuit 12. Three photographic films 13, 13a and 13b are shown being processed by the automatic film developer and are to be considered moving in the direction of arrow 14. Assume for the sake of discussion that the developer is at the state of processing whereby film 13b has been developed and film 13a is about to be processed. A light source 16 or source of radiant energy projects a beam 17 on the film as it passes which is indicated by the dashed lines, and a photocell or radiant energy sensor 18 connected by a line 19 to control circuit 12 is actuated. A time delay sufficient to allow motor 11 to continue to drive the belt conveyor 10 until 13a encounters a switch arm 20 actuating a switch 21 coupled through a line 22 to the control circuit 12. When this happens the power to motor 11 through line 23 is stopped. When the proper sequence has occurred control circuit 12 actuates a motor 30 which drives the geared cam 31 engaging a plurality of gear teeth 32 causing a support member 33, containing one of two heating elements 34 and 35 to move towards film 13a. A geared, pivoted, rotating member 36 engaging a first and second series of gear teeth 37 on element 35 drives element 35 towards film 13a and the control circuit rotates the cam 31 to the point where heating elements 34 and 35 engage the film 13a in juxtaposition as shown in FIGURE 1. After sufficient time to develop the heat sensitive film 13a, arm 20 is rotated out of the way by device 21 and the motor 11 actuates the belt 10 moving the film 13a to the position occupied by 13b. As the film passes, the arm 20 is returned to its original position ready to stop the next film as it comes through. This process is to repeat itself individually processing the film as they pass between the heating element 34, 35. The timing sequence is accomplished by cam 41 and switches 42 and 43 shown schematically as connected to timing circuit 12. Their function is to open and close circuits in proper sequence to allow for proper heating of the film.

Obviously many modifications and variations of the present invention are possible in the light of the above teachings. It is therefore to be understood that within the scope of the appended claims the invention may be practiced otherwise than as specifically described.

I claim:
1. An improved automatic film developer for developing sensitive film, comprising:
    (a) a movable film holder capable of holding a plurality of heat sensitive films to be developed;
    (b) first drive means for moving said film holder;
    (c) a plurality of films held on said movable holder;
    (d) first and second heating elements positioned adjacent said movable means capable of being moved towards and away from each other;
    (e) second drive means for moving said heating elements towards and away from each other;
    (f) first switching means for stopping said first drive means;
    (g) second switching means for determining the position of individual ones of said films; and
    (h) circuit means coupled to actuate said first drive means, said first switch means, said second switch means, said second drive means for heating and developing consecutive ones of said films.
2. The developer of claim 1 wherein said circuit means actuates the developer in the following order:

(a) actuates said first drive means to advance said film;
(b) said second switch means sensing the position of one of said films;
(c) moving said one of said films between said heating elements;
(d) said first switching means stopping said first moving means;
(e) actuating said second drive moving means to juxtaposition said first and second heating elements to said one of said films;
(f) applying heating current to said heating elements for a predetermined length of time;
(g) moving said heating elements away from said film; and
(h) starting said first drive means to advance said developed film from between said heating elements and to advance the next of said films to be developed.

3. The developer of claim 2 wherein said heating elements have first and second opposed geared portions and a free turning gear engaged with said first and second geared portions, and said second drive includes a second gear means engaging a third geared portion on one of said heating elements so that rotation in one direction of said second drive means moves said heating elements towards each other and rotation in the opposite direction moves the heating elements apart.

4. The developer of claim 3 wherein said second gear means has a cam surface to actuate a third switching means to control the operation of said heating elements.

5. The developer of claim 4 wherein said second switching means includes a source of radiant energy and a radiant energy sensor positioned to receive radiant energy when one of said films is advanced to a specific point by said movable film holder and intercepts the radiant energy beam.

6. The developer of claim 5 wherein a timer circuit in said circuit means is actuated by said radiant energy sensor to stop said first drive means after the movable belt has moved a given amount after said film intercepts said beam.

References Cited

UNITED STATES PATENTS

| | | | |
|---|---|---|---|
| 2,442,407 | 6/1948 | Gibbons et al. | 219—388 |
| 2,465,215 | 3/1949 | Fergnani | 250—223 |
| 2,740,895 | 4/1956 | Miller | 250—65 |
| 3,164,717 | 1/1965 | Kaufman | 219—388 |
| 3,242,342 | 3/1966 | Gabar | 250—223 |

NORTON ANSHER, *Primary Examiner.*

CHARLES E. SMITH, *Assistant Examiner.*